US006890614B2

(12) United States Patent
Gore et al.

(10) Patent No.: US 6,890,614 B2
(45) Date of Patent: May 10, 2005

(54) METAL SALT ACTIVATORS FOR USE IN LEUCO DYE COMPOSITIONS

(75) Inventors: Makarand P. Gore, Corvallis, OR (US); Jayprakash Bhatt, Corvallis, OR (US); Vladek P Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 10/656,539

(22) Filed: Sep. 5, 2003

(65) Prior Publication Data

US 2005/0053748 A1 Mar. 10, 2005

(51) Int. Cl.$^7$ .................................................. B32B 3/02

(52) U.S. Cl. .................... 428/64.1; 428/64.4; 428/64.8; 430/270.11; 430/495.1; 503/212; 503/216

(58) Field of Search .............................. 428/64.1, 64.4, 428/64.8, 913; 430/270.11, 495.1, 945; 503/212, 216, 218, 225

(56) References Cited

U.S. PATENT DOCUMENTS

| | | | | | |
|---|---|---|---|---|---|
| 2,777,780 | A | | 1/1957 | Cormack et al. | |
| 3,445,233 | A | | 5/1969 | Cescon | |
| 3,658,543 | A | | 4/1972 | Gerlach, Jr. et al. | |
| 3,767,449 | A | * | 10/1973 | Hayashi et al. | 428/323 |
| 3,900,218 | A | * | 8/1975 | Miyamoto et al. | 503/205 |
| 3,952,117 | A | | 4/1976 | Miyamoto | |
| 4,180,405 | A | | 12/1979 | Lawton | |
| 4,876,175 | A | | 10/1989 | Chen et al. | |
| 5,500,040 | A | | 3/1996 | Fujinami | |
| 5,672,560 | A | * | 9/1997 | Rush | 503/209 |
| 5,880,062 | A | | 3/1999 | Sanders et al. | |
| 6,015,589 | A | | 1/2000 | Mehta et al. | |
| 6,251,571 | B1 | | 6/2001 | Dessauer et al. | |
| 6,329,035 | B1 | * | 12/2001 | Iwasaki et al. | 428/64.1 |
| 6,432,624 | B1 | | 8/2002 | Kikuchi et al. | |
| 6,660,452 | B2 | * | 12/2003 | Iwasaki et al. | 430/270.13 |
| 2003/0108708 | A1 | * | 6/2003 | Anderson et al. | 428/64.4 |
| 2004/0146812 | A1 | * | 7/2004 | Gore et al. | 430/343 |
| 2004/0213922 | A1 | * | 10/2004 | Abrams et al. | 427/596 |
| 2004/0219327 | A1 | * | 11/2004 | Matsuishi et al. | 428/64.4 |

FOREIGN PATENT DOCUMENTS

| | | |
|---|---|---|
| EP | 0 381 492 | 8/1990 |
| WO | WO 02/14442 | 2/2002 |
| WO | WO 03/032299 A2 | 4/2003 |

* cited by examiner

*Primary Examiner*—Elizabeth Mulvaney

(57) ABSTRACT

Compositions and methods for production of color images using leuco dye-containing color forming compositions are described. The color forming composition can include a color forming leuco dye, a metal salt activator, a suppression agent configured for inhibiting the activity of the metal salt activator until application of energy in the form of heat or light, and an initiator precursor. The initiator precursor is capable of liberating scavenger species which reduce the inhibiting action of the suppression agent. The color forming compositions can be a single phase mixture of a leuco dye, metal salt activator, suppression agent, and initiator precursor which are stable under ambient conditions and form a colored composition upon application of energy.

39 Claims, No Drawings

METAL SALT ACTIVATORS FOR USE IN LEUCO DYE COMPOSITIONS

FIELD OF THE INVENTION

The present invention relates generally to leuco dye compositions. More particularly, the present invention relates to leuco dye compositions and their use in forming color images.

BACKGROUND OF THE INVENTION

Compositions which produce a color change upon exposure to light or heat are of great interest in producing images on a variety of substrates. Optical disks represent a significant percentage of the market for data storage of software as well as of photographic, video, and/or audio data. Typically, optical disks have data patterns embedded thereon that can be read from and/or written to one side of the disk, and a graphic display printed on the other side of the disk.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions or pre-printed labels which may be affixed to the disk, but which can also adversely affect the disk performance upon spinning at high speeds.

Recently, a variety of leuco dye-containing compositions have been investigated for use on optical disks and other substrates. Typical leuco dye compositions include a leuco dye along with an activator. However, many of these compositions are insufficiently stable under ambient light conditions for practical use. For this and other reasons, the need still exists for improved leuco dye compositions which have improved stability, image forming, and developing characteristics.

SUMMARY OF THE INVENTION

It has been recognized that it would be advantageous to develop rapidly developable and light stable color forming compositions which are capable of formulation in a single phase mixture.

In one aspect of the present invention, a color forming composition can comprise a mixture of a color forming leuco dye, a metal salt activator which can react with the color forming leuco dye to form a colored dye, a suppression agent for inhibition of reaction between the metal salt activator and the leuco dye, and an initiator precursor.

In another aspect of the present invention, a method of forming color images on a substrate can comprise applying a color forming composition onto a substrate. The color forming composition can include a color forming leuco dye, a metal salt activator which can react with the color forming leuco dye to form a colored dye, a suppression agent for inhibition of reaction between the metal salt activator and the leuco dye, and an initiator precursor. Energy can then be applied to the color forming composition sufficient to cause formation of an initiator from the initiator precursor. The initiator can subsequently react with the suppression agent, thereby releasing the metal salt activator to allow for reaction with the leuco dye.

Additional features and advantages of the invention will be apparent from the detailed description which follows, which illustrates, by way of example, features of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a suppression agent" includes reference to one or more of such materials.

As used herein, the term "color forming composition" typically includes a leuco dye, a metal salt activator, a suppression agent, and an initiator precursor. These four components can work together in a cascade of reactions upon exposure to energy to provide color to the leuco dye. For purposes of the present invention, the term "color" can be any change in visible absorbance that occurs upon leuco dye development, including development of black, white, and traditional colors.

As used herein, "leuco dye" refers to a dye which, prior to development, is in a leuco form which is substantially colorless or white, and which reacts with an activator upon exposure to energy in the form of heat or light to form a colored dye. The color-altering phenomenon is typically due to a chemical change, such as through oxidation, resulting from heat exposure.

The term "activator" refers to a compound that has an acid, e.g., Lewis acid, functionality such as a complexed transition metal, metal salt, or phenolic compound, and can be reactive with leuco dyes with or without introduction of energy in the form of light and/or heat.

The term "suppression agent" refers to a base, e.g., Lewis base, such as an amine that can complex with the metal salt activator and mask the activator, thereby substantially preventing the color forming reaction.

The term "initiator precursor" refers to a compound which forms and/or liberates initiator compound upon introduction of sufficient energy. For example, initiator precursors can have ester or anhydride functionalities that can release an acyl group(s) which can act as an initiator upon introduction of energy. The non-acyl portion of the initiator precursor can be a secondary activator or a compound which does not substantially participate in the color forming reaction.

The term "initiator" refers to a compound which reacts with the suppression agent to expose the functional group(s) of an activators), upon exposure to a predetermined amount of energy in the form of heat or light.

As used herein, "acyl" refers to a chemical species containing a carbonyl group and an R group having the general formula

where R can be hydrogen, aryl, aliphatic, or other substituted or unsubstituted carbon-containing group.

As used herein, "developing," "development," or the like refers to the interaction or reaction of a leuco dye with an activator to produce a visible composition having a desired color.

As used herein, "absorber" refers generally to an optional electromagnetic radiation sensitive agent that can generate heat or otherwise transfer energy to surrounding molecules by electrical contact upon exposure to a predetermined frequency of electromagnetic radiation. The predetermined frequency can be different from one absorber composition to the next. When admixed with or in thermal or electrical contact with a leuco dye and/or activator, an absorber can be present in sufficient quantity so as to produce heat sufficient to at least partially develop the leuco dye in accordance with embodiments of the present invention.

The term "thermal contact" refers to the spatial relationship between an absorber and a color forming composition. For example, when an absorber is heated by interaction with electromagnetic radiation, the heat generated by the absorber should be sufficient to cause the leuco dye of the color forming composition to darken through reaction with an exposed activator. Thermal contact can include close proximity between an absorber and a color forming composition, which allows for heat transfer from the absorber toward the leuco dye, activator, and/or initiator. Thermal contact can also include actual contact between an absorber and a leuco dye and/or activator, such as in immediately adjacent layers, or in an admixture including both constituents.

"Electrical contact" refers to the proximity of molecules in distances on the scale of van der Walls radii, in crystalline matrix or films, where the molecules can react in ground or excited states and form activated species such as "exiplexes".

"Stabilizing agent" refers to compositions that can be used to reduce undesired development of leuco dyes upon exposure to ambient or other light sources.

The term "spin-coatable composition" includes a liquid carrier having various components dissolved or dispersed therein. In some embodiments, the spin-coatable composition can comprise a color forming composition and an infrared absorber in a common liquid carrier. In other embodiments, fewer components can be present in a liquid carrier forming the spin-coatable composition. Thus, for example, the color forming composition can be spin-coatable and applied to a substrate and then an infrared absorber can be formed in a separate layer which can be applied by spraying, screen-printing, or other methods which do not require spin coatability. Color forming compositions can be spin-coatable in one embodiment, or can be configured for other application methods as well e.g. printing such as offset, inkjet, gravure, roller coating or other application methods known to those skilled in the art.

As used herein, "optical density" refers to the logarithm of the reciprocal of reflectance, where reflectance is the ratio of reflected power to incident power.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, and the like. Other like formats may also be included, such as similar formats and formats to be developed in the future.

As used herein, "protonic acid" refers to an acid which ionizes in aqueous solution to liberate hydrogen ions. Typical protonic acids include, but are not limited to, hydrochloric acid, sulfuric acid, phosphoric acid, fluoric acid, bromic acid, and the like.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

It is important to note that, with respect to leuco dyes, absorbers, activators, suppression agents, initiator precursors, and other non-liquid carrier components, the weight percent values are measured relative to a dry basis, thus excluding the liquid carrier. In other words, unless otherwise specified, values of "wt %," "% by weight," or "weight percent" refer to the compositions that will be present in the color forming composition excluding any carrier, such as after drying or curing, as in case of UV (ultraviolet) or EB (electron beam) curable formulations, on a substrate.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 $\mu$m to about 200 $\mu$m should be interpreted to include not only the explicitly recited limits of 1 $\mu$m to about 200 $\mu$m, but also to include individual sizes such as 2 $\mu$m, 3 $\mu$m, 4 $\mu$m, and sub-ranges such as 10 $\mu$m to 50 $\mu$m, 20 $\mu$m to 100 $\mu$m, etc.

In accordance with the present invention, the color forming composition can include a leuco dye, a metal salt activator, a suppression agent, and an initiator precursor. The metal salt activators of the present invention can be configured to react with the leuco dye to form a colored dye. The suppression agent can be included in the composition in order to inhibit the color forming reaction from occurring until desired. The initiator precursor can liberate an initiator upon application of energy such that the initiator can react with the suppression agent and render it inactive with respect to its suppressing activity. Specifically, upon application of energy, the inhibiting action of the suppression agent can be decreased due to reaction with the initiator sufficient to allow reaction between at least a portion of the leuco dye and metal salt activator. In one detailed aspect, the color forming compositions of the present invention can further include initiator precursors which, in addition to forming the initiator, also form secondary activators which include at least one acid group. Upon application of energy in the form of heat or light, the initiator is formed from the initiator precursor to form an initiator which can react with the suppression agent exposing Lewis acid sites of the metal salt activator. In this alternative embodiment, the secondary activator and metal salt activator can then react with the leuco dye to form a colored dye.

In one specific embodiment of the present invention, the color forming reaction of Lewis acid activators such as zinc 3,5-di-tert-butyl salicylate, with leuco dyes can be suppressed or reversed by suppression agents, e.g. butyl amine and 1-amino-2-propanol. However, the suppression reaction is not typically easily reversed. Therefore, use of a compound that removes the suppression agent allows the color forming reaction to proceed at a desired time. Hence, the use of acyl compounds as initiators which are formed from initiator precursors such as esters or anhydrides can be used to react with the suppression agent and metal salt activator in a polymer matrix. Advantageously, acyl initiators can also concurrently serve as scavengers for the amine suppression agent and unmask the metal salt activator. In another aspect, the acyl compounds can be acyl phenols or carbonates that release phenolic and zinc activators in the same reaction. The acyl initiator can be chosen such that it can be activated by supplying energy in the form of an intense burst of energy, such as by heat, light, or laser energy. An infrared absorber can be added to the composition to enhance energy transfer. The color forming compositions of the present invention can include a variety of components which are discussed in more detail below.

Metal Salt Activators and Suppression Agents

In one aspect of the present invention, the color forming composition includes a metal salt activator. In one embodiment, the metal salt activator can be a metal salt of an aromatic carboxylic acid. Metals suitable for use in the present invention can include transition metals such as zinc, tin, nickel, iron, and other transition metals. In one detailed aspect, the metal salt activator can be a zinc salt of an aromatic carboxylic acid. In another aspect, the carboxylic acid can be a salicylic acid. For example, zinc 3,5-di-t-butyl salicylate is one suitable metal salt activator. Other suitable metal salt activators include zinc salicylate, tin salicylate, zinc 2-hydroxy naphthoate, 3,5-di-α-methylbenzyl zinc salicylate, metal salts of rhodanate, xanthate, aluminate, titanate, and zirconate, and mixtures thereof. Typically, the metal salt activator can be present in the color forming compositions of the present invention at from about 1 wt % to about 40 wt %. Although amounts outside this range can be successfully used depending on the other components of the composition, amounts of from about 5 wt % to about 20 wt % frequently provide adequate results.

In order to prevent the above metal salt activators from immediately reacting with the leuco dye, in accordance with the present invention, an amine suppression agent can be added which temporarily inhibits the color forming reaction. Suppression agents suitable for use in the present invention, include primary amines, secondary amines, and alpha-hydroxy amines. In one detailed aspect, the suppression agent can be a lower amine having from one to five carbon atoms. In another aspect, the suppression agent can be a primary amine. Exemplary suppression agents include, without limitation 2-hydroxy-1-aminopropanol, butyl amine, valoneol, prolinol, 2-amino-3-phenyl-1-propanol, (R)-(-)-2-phenyl glycinol, 2-amino-phenylethanol, 1-naphthylethyl amine, 1-aminonaphthalene, morpholin, and mixtures thereof. Additionally, chelating agents such as 1,3-diketones, diols, keto-esters, and mixtures thereof can be used as suppression agents. In one detailed aspect of the present invention, the suppression agent can be 2-hydroxy-1-aminopropanol or butyl amine. In another aspect, suitable suppression agents include amines such as those melting between 35° C. to 175° C., including 2-amino-3-phenyl-1-propanol, (R)-(-)-2-phenyl glycinol, 2-amino-phenylethanol, or such as those boiling between 80° C. and 310° C., including 1-naphthyl ethyl amine, 1-aminonaphthalene, morpholin, and the like.

The suppression agent can be typically present in a sufficient amount to inhibit the activity of the metal salt activator at ambient light and temperature conditions. In one embodiment, a molar ratio of about 1:1 metal salt activator to suppression agent can be desirable. However, the suppression agent can also act as a deprotecting agent for a secondary activator as discussed below, in which case different amounts of suppression agent may be desirable. Typically, the suppression agent can be present in the color forming compositions of the present invention at from about 1 wt % to about 40 wt % and more often from about 1 wt % to about 20 wt %.

Initiator Precursors

Initiator precursors can be included in the color forming compositions of the present invention which are configured to liberate an initiator that can neutralize the suppression agent and allow the metal salt activator to react with the leuco dye. In accordance with the present invention, a compound that liberates a species, e.g. amine scavengers, which can neutralize the suppression agent can be used. In one embodiment of the present invention, initiator precursors can include molecules with ester or anhydride functionalities which can liberate an acyl initiator. Thus, upon application of sufficient energy, the initiator precursor liberates an acyl initiator and a second compound. The second compound can be an activator configured for reaction with the leuco dye or a compound which does not substantially participate in the color forming reaction of the present invention. Thus, in addition to the metal salt activators, various secondary activators can also be included in the color forming compositions of the present invention which have the functional group(s) protected by an acyl initiator. For example, when using phenolic esters as initiator precursors, a phenol activator can be released as the suppression agent reacts with the acyl group of the phenolic ester. A wide variety of initiator precursors are available, which can react with the amine suppression agent upon application of energy. Preparation of such initiator precursors can be performed as described in Greene, TW and Wuts, PGM "Protective Groups in Organic Synthesis", John Wiley, N.Y., 2nd Edition (1991), the disclosure of which is hereby incorporated herein by reference in its entirety (see especially pages 246–292). The reactions as described in J. F. W. McOmie, "Protective Groups in Organic Chemistry", Plenum Press (1973), which is also incorporated herein by reference in its entirety, can also be used.

Although a variety of methods can be utilized to form the initiator precursors of the present invention, such as those described in Greene and McOmie, the following discussion illustrates several exemplary means for protecting an acid functional group(s) of a secondary activator with an initiator to form an initiator precursor. Phenolic and catechol esters can be prepared by acylation and condensation reactions with an acyl chloride, acyl anhydride, or activated ester such as succinimidyl ester. Such acylation and condensation reactions can be performed in the presence of a base such as NaOH or simply by heating. Alternatively, the reaction can be performed by mixing an amine such as triethyl amine with a dipolar aprotic solvent, e.g., acetonitrile or dioxane, followed by an aqueous work up (addition of water and subsequent extraction of the initiator precursor using ether or the like) or evaporation and purification.

More specifically, the initiator precursors employed in the present invention can contain various functional groups, such as anhydrides, carbonates, and other groups which can act as an electrophile. After the secondary activator reacts with the acyl group, the resulting initiator precursor can be an ester, sulfonate, carbonate, carbamate, anhydride, or phosphinate. Several specific initiator precursors include trifluoroacetate, 2-trimethylsilyl ethyl ester, t-butyl ester, p-nitrobenzyl ester, nitrobutyl ester, and trichloroethyl ester.

Examples of acidic materials that can be use as secondary activators to form initiator precursors include, without limitation, phenols, carboxylic acids, cyclic sulfonamides, protonic acids, zinc chloride, and other compounds having a pKa of less than about 7.0, and mixtures thereof. Specific phenolic and carboxylic secondary activators can include, without limitation, boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-t-butylphenyl, 4-hydroxyphenoxide, methyl-4-hydroxybenzoate, 4-hydroxyacetophenone, α-naphthol, naphthols, catechol, resorcin, hydroquinone, 4-t-octylcatechol, 4,4'-butylidenephenol, 2,2'-dihydroxydiphenyl, 2,2'-methylenebis(4-methyl-6-t-butyl-phenol), 2,2'-bis(4'-hydroxyphenyl) propane, 4,4-isopropylidenebis(2-t-butylphenol), 4,4'-secbutylidenediphenol, pyrogallol, phloroglucine, phlorogluocinocarboxylic acid, 4-phenylphenol, 2,2'-methylenebis(4-chlorophenyl), 4,4'-isopropylidenediphenol, 4,4'-isopropylidenebis(2-chlorophenol), 4,4'-isopropylidenebis(2-methylphenol), 4,4'-ethylenebis(2-methylphenol), 4,4'-thiobis(6-t-butyl-3-methylphenol), bisphenol A and its derivatives (such as 4,4'-isopropylidenediphenol (bisphenol A), 4-4'-cyclohexylidenediphenol, p,p'-1-methyl-n-hexylidene) diphenol, 1,7-di (4-hydroxyphenylthio)-3,5-dioxaheptane), 4-hydroxybenzoic esters, 4-hydroxyphthalic diesters, phthalic monoesters, bis(hydroxyphenyl)sulfides, 4-hydroxyarylsulfones, 4-hydroxyphenylarylsulfonates, 1,3-di[2-(hydroxyphenyl)-2-propyl]benzenes, 1,3-dihydroxy-6(α,α-dimethylbenzyl)benzene, resorcinots, hydroxybenzoyloxybenzoic esters, bisphenolsulfones, bis-(3-allyl-4-hydroxyphenyl)sulfone (TG-SA), bisphenolsulfonic acids, 2,4-dihydroxy-benzophenones, novolac type phenolic resins, polyphenols, saccharin, 4-hydroxy-acetophenone, p-phenylphenol, benzyl-p-hydroxybenzoate (benzalparaben), 2,2-bis(p-hydroxyphenyl) propane, p-tert-butylphenol, 2,4-dihydroxy-benzophenone, and p-benzylphenol.

In one aspect of the present invention, the secondary activator can be a phenol compound. In a more detailed aspect, the secondary activator can be a bisphenol such as TG-SA. In yet another aspect, the secondary activator compound can be an acid selected from the group consisting of boric acid, oxalic acid, maleic acid, tartaric acid, citric acid, succinic acid, benzoic acid, stearic acid, gallic acid, salicylic acid, ascorbic acid, and mixtures thereof.

Initiator Functional Groups

As mentioned above, the activity of the initiators of the present invention can be protected by attachment to a secondary activator or other compound. Compounds suitable for use as initiator precursor materials can include those which liberate acyl groups or include other amine scavengers such as silica gel, alumina, and the like. In one aspect, the initiator can be a means for protecting the acid functional group of the secondary activator. If the functional group of the secondary activator, or other non-activator compound, is a hydroxy group, suitable protecting groups can form initiator precursors such as esters, sulfonates, ethers, phosphinates, carbonates, carbamates (i.e. esters of carbamic acid), and mixtures thereof.

Several non-limiting examples of esters suitable for use in the present invention include formate ester, acetate ester, isobutyrate ester, levulinate ester, pivaloate ester, aryl pivaloate esters, aryl methanesulfonate esters, adamantoate ester, benzoate ester, 2,4,6-trimethylbenzoate (mesitoate) ester, 2-trimethyl silyl ester, 2-trimethylsilyl ethyl ester, t-butyl ester, p-nitrobenzyl ester, nitrobutyl ester, trichloroethyl ester, any alkyl branched or aryl substituted ester, 9-fluorenecarboxylate, xanthenecarboxylate, and mixtures thereof.

Several non-limiting examples of carbonates and carbamates suitable for use in the present invention include 2,2,2-trichloroethyl carbonate, vinyl carbonate, benzyl carbonate, methyl carbonate, p-nitrophenyl carbonate, p-nitrobenzyl carbonate, S-benzyl thiocarbonate, N-phenylcarbamate, 1-adamantyl carbonate, t-butyl carbonate, 4-methylsulfinylbenzyl, 2,4-dimethylbenzyl, 2,4-dimethylpent-3-yl, aryl carbamates, methyl carbamate, benzyl carbamate, cyclic borates and carbonates, and mixtures thereof.

Several non-limiting examples of phosphinates suitable for use in the present invention include dimethylphosphinyl, dimethylthiophosphinyl, dimethylphosphinothioyl, diphenylphosphothioyl, and mixtures thereof.

Several nonlimiting examples of sulfonates suitable for use in the present invention include methanesulfonate, toluenesulfonate, 2-formylbenzenesulfonate, and mixtures thereof.

Exemplary groups for carbonyl functional groups of initiators can include, for example, t-butyloxycarbonyl, allyloxycarbonyl, benzyloxycarbonyl, o-nitrobenzyloxycarbonyl, and trifluoroacetate.

The color forming compositions of the present invention can include from about 6 wt % to about 45 wt % of initiator in one embodiment. In another embodiment, the initiator can be present from about 20 wt % to about 40 wt %. In a further detailed aspect, the initiator can be present at from about 25 wt % to about 38 wt %.

The suppression agents described above can also act as deprotecting agents which are configured for removing the initiator from the initiator precursor upon application of heat. Thus, the suppression agents of the present invention can simultaneously act to inhibit the activity of the metal salt activator and provide a mechanism for removing the acyl initiators upon application of sufficient energy. As the suppression agent reacts with the acyl initiator, the suppression agent also no longer inhibits the activity of the metal salt activator, thus allowing both the metal salt activator and the secondary activator, if present, to develop the leuco dye. In one aspect, the suppression agent can provide a means for removing the above acyl initiators via a chemical reaction therewith to generate a secondary activator such as a phenol or carboxylic acid. The suppression agent can be present at any concentration which is sufficient to react with enough acyl initiator to allow a visible color change in the leuco dye. It will be understood that the concentration of suppression agent can be tailored to affect the speed and degree of the reaction upon exposure to heat. However, as a general guideline, the suppression agent to initiator molar ratio can be from about 10:1 to about 1:4, and one aspect can be from about 1:1 to about 1:2.

Leuco Dyes

Leuco dyes suitable for use in the present invention include almost any known leuco dye. Suitable leuco dyes include, but are not limited to, fluorans, phthalides, amino-triarylmethanes, aminoxanthenes, aminothioxanthenes, amino-9,10-dihydro-acridines, aminophenoxazines, aminophenothiazines, aminodihydro-phenazines, amino-diphenyl methanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2, 3-dihydroanthraquinones, tetrahalo-p,p'-biphenols, 2(p-hydroxyphenyl)-4,5-diphenylimidazoles, phenethylanilines, and mixtures thereof. In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o, p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino) fluorane, 3-diethylamino-7-(O-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidin-6-methyl-7-anilinofluoran, 1(3H)-isobenzofuranone,4,5,6,7-tetrachloro-3,3-bis[2-[4(dimethylamino)phenyl]-2-(4-methoxyphenyl)ethenyl], and mixtures thereof. Aminotriarylmethane leuco dyes can also be used in the present invention such as tris(N,N-dimethylaminophenyl) methane (LCV); deutero-tris(N,N-dimethylaminophenyl) methane (D-LCV); tris(N,N-diethylaminophenyl)methane (LECV); deutero-tris(4-diethylaminolphenyl)methane (D-LECV); tris(N,N-di-n-propylaminophenyl)methane (LPCV); tris(N,N-di-n-butylaminophenyl)methane (LBCV); bis(4-diethylaminophenyl)-(4-diethylamino-2-methyl-phenyl)methane (LV-1); bis(4-diethylamino-2-methylphenyl)-(4-diethylamino-phenyl)methane (LV-2); tris (4-diethylamino-2-methylphenyl)methane (LV-3); deutero-bis(4-diethylaminophenyl)-(4-diethylamino2-methylphenyl)methane (D-LV-1); deutero-bis(4-diethylamino-2-methylphenyl)(4-diethylaminophenyl) methane (D-LV-2); bis(4-diethylamino-2-methylphenyl)(3, 4-dimethoxyphenyl)methane (LB-8); aminotriarylmethane leuco dyes having different alkyl substituents bonded to the amino moieties wherein each alkyl group is independently selected from C1–C4 alkyl; and aminotriaryl methane leuco dyes with any of the preceding named structures that are further substituted with one or more alkyl groups on the aryl rings wherein the latter alkyl groups are independently selected from C1–C3 alkyl. Other leuco dyes can also be used in connection with the present invention and are known to those skilled in the art A more detailed discussion of some of these types of leuco dyes may be found in U.S. Pat. Nos. 3,658,543 and 6,251,571, each of which are hereby incorporated by reference in their entireties.

Upon heat-induced oxidation, protonation, ring-opening, or the like, in the presence of the uninhibited metal salt activator and/or unprotected secondary activator, the above-recited leuco dyes can form dyes having a variety of optical characteristics. Although a wide range of compositions are suitable for use in the present invention, the color forming composition can contain at least about 3 wt % of leuco dye, and in more detail, can be present at from about 4 wt % and about 20 wt %. These ranges are only exemplary and other weight ranges can be used, depending on the desired image characteristics and other considerations.

Electromagnetic Radiation Absorber

An electromagnetic radiation absorber can optionally be part of the color forming composition. The radiation absorber can be applied as a separate layer which can be optionally spin-coatable or printable, or can be applied in a common liquid carrier with the color forming composition. The absorber can act as an energy antenna, providing heat to surrounding areas upon interaction with an energy source. As a predetermined amount of heat can be provided by the electromagnetic radiation absorber, matching of the electromagnetic radiation frequency and intensity to the absorber used can be carried out to optimize the system. The absorber can be present in the color forming composition in an amount of from about 0.001 wt % to about 10 wt %, and typically, from about 0.5 wt % to about 1 wt %, although other weight ranges may be desirable depending on the activity of the particular absorber. These weight percentages represent an amount of absorber that can be present when included as part of the color forming composition. These weight percentages can be altered in other embodiments, such as when the absorber is applied separately with respect to one or more other layers. Thus, it will be understood that typically the color forming composition including at least a leuco dye, metal salt activator, suppression agent, and initiator precursor can be prepared as a single phase mixture and the absorber can be included therein or in a separate layer.

Various absorbers will act as an antenna to absorb electromagnetic radiation of specific frequencies and ranges. Of particular interest is laser light having infrared frequencies from about 600 nm to about 1200 nm. Therefore, the present invention can provide color forming compositions optimized for use in devices that emit frequencies within this range. Typical commercial IR lasers found in common CD and DVD equipment are at a frequency of about 650, 780, and 900 nm, and thus, the compositions of the present invention using appropriate infrared radiation absorbers can be used in equipment that is already commonly available on the market.

The absorber can be configured to be in a heat-conductive relationship with the leuco dyes of the present invention. For example, the absorber can be placed in the same layer as the leuco dye as part of an admixture, or can be in a separate layer. Thus, the absorber can be admixed with or in thermal or electrical contact with the color forming composition. In one aspect of the present invention, the absorber can be applied to the substrate in a separate adjacent layer prior to or after applying the color forming composition as a layer. In one embodiment, consideration can also be given to choosing the absorber such that any light absorbed in the visible range does not adversely affect the graphic display or appearance of undeveloped leuco dye.

Although an inorganic compound can be used, the absorber typically can be an organic compound, such as, but not limited to polymethine dyes, polymethyl indolium dyes, metal complex IR dyes, indocyanine green, heterocyclic compounds and combinations thereof. Suitable polymethyl indolium compounds available from Aldrich Chemical Company include 2-[2-[2-chloro-3-[2-(1,3-dihydro-1,3,3-trimethyl-2H-indol-2-ylidene)-ethylidene]1-cyclopenten-1-yl-ethenyl]-1,3,3-trimethyl-3H-indolium perchlorate; 2{2-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene) ethylidene]-1-cyclohexen-1-yl]ethenyl]-3,3-dimethyl-1-propylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium iodide; 2-[2-[2-chloro-3-[(1,3-dihydro-1,3,3-trimethyl-2H-indol-2-ylidene) ethylidene]-1-cyclohexen-1-yl]ethenyl]-1,3,3-trimethylindolium perchlorate; 2-[2-[3[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof. In one aspect of the present invention, the IR absorber can be 2-[2-[2-chloro-3-[2-(1,3-dihydro-1,3,3-trimethyl-2H-indol-2-ylidene)-ethylidene]1-cyclopenten-1-yl-ethenyl]-1,3,3-trimethyl-3H-indolium perchlorate. Other suitable absorbers can also be used in the present invention as are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both of which are incorporated herein by reference in their entireties. Although, the specific activators and absorbers discussed herein are separate compounds, such activity can also be provided by constituent groups of a leuco dye which incorporates the activation and/or radiation absorbing action within the leuco dye molecule.

Other Optional Ingredients

There are many optional ingredients that can be present in the compositions of the present invention. For example, a binder can also be included in the compositions of the present invention, either in single layer or multiple layer embodiments. Suitable binders are known to those skilled in the art and can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. In order to provide desirable color forming properties, various factors such as viscosity and solids content can be considered. The color forming compositions of the present invention can have less than about 10 wt % of solids, which typically provides good coating properties. For example, in one aspect, the solids content of a spin-coatable color forming composition can be about 7 wt %.

It can sometimes be desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety.

Stabilizing agents can also be included in the color forming compositions of the present invention or in an adjacent layer. Several examples of suitable stabilizing agents include a polyhydroxybenzophenone, hydroxylamine, triarylimidazole, hydroxyphenylbenzotriazole, and mixtures thereof.

Other variations can also be implemented, including the adding of a non-leuco colorant to impart additional desired color to the image. For example, the use of an opacifier pigment or other non-leuco colorant can be used to provide background color to the substrate. The non-leuco colorants can be added to the color forming composition, underprinted, or overprinted as long as the development of the leuco dye is not prevented from at least some development due to the presence of the optional colorant. In another embodiment, portions of the leuco dye can then be developed producing an image with a colored background. Examples of opacifiers include calcium carbonate, titanium dioxide, and other known opacifiers. Additionally, examples of other non-leuco colorants include dyes or other pigments. In other words, if a colored background is desired that will remain independent of leuco dye development, an opacifier pigment, other pigment, and/or dye can be admixed in the carrier to impart the desired color.

Various additional components, such as lubricants, surfactants, and materials imparting moisture resistance, can also be added to provide mechanical protection to the color forming composition. Other overcoat compositions can also be used and are well known to those skilled in the art.

Electromagnetic Radiation Application for Development

In one embodiment of the present invention, the color forming composition can be applied to a substrate. The composition can be applied using any known technique such as spin-coating, screen printing, sputtering, spray coating, ink-jetting, or the like. A variety of substrates can be used such as optical disks, polymeric surfaces, glass, ceramic, or cellulose papers. In one embodiment, the color forming composition can be applied to an optical disk and select portions thereof developed using a laser or heat source. Typically, an image to be formed on the surface can be digitally stored and then rasterized or spiralized. The resulting data can be delivered to an infrared radiation source which exposes portions of the color forming composition to infrared radiation while the optical disk is spinning. The infrared radiation source can be a laser such as those found in commercially available CD/DVD writeable and/or rewriteable systems.

The present invention relates generally to forming color images on a substrate using the color forming compositions of the present invention which can optionally be spin-coatable or printable. The compositions of the present invention can be prepared and applied in a variety of ways to a variety of substrates. For example, a color forming composition can be prepared that includes a liquid carrier, which can be substantially removed upon drying, that contains, without limitation, a leuco dye, a metal salt activator, an initiator, a suppression agent, an electromagnetic radiation absorber, and a binder. The color forming composition includes the liquid carrier, which can act to improve coating performance, but which can be removed upon coating through known liquid removal processes. Typically, at least a portion of the liquid carrier can be driven off or allowed to evaporate after the coating process is complete. The liquid carrier can include, but is not limited to, solvents such as methylethyl ketone, isopropyl alcohol or other alcohols, water, surfactants, and mixtures thereof.

The color forming composition can cover the entire surface of a substrate or merely a portion thereof. In one embodiment, in order for the color forming composition to be developed as desired on the optical disk surface, an absorber layer can be formed on at least approximately the same portions of the optical disk as the color forming composition layer. This provides an optical disk having the absorber layer in thermal contact with the color forming composition layer. If the two layers are not in actual contact, but are close enough in proximity for thermal activation of the leuco dye to occur, the layers can also be said to be in thermal contact. Alternatively, as stated, the absorber can be admixed with the color forming composition.

Once the color forming composition is applied to a substrate the conditions under which the color forming compositions of the present invention are developed can be varied. For example, one can vary the electromagnetic radiation frequency, heat flux, and exposure time. The amount of heat which is to be applied depends partially on the activation energy of the reaction deprotecting reaction described above. However, the heat applied can be sufficient to remove the protection leaving group without also decomposing the color forming composition. The heat is most effectively applied from between 100 to 500 microseconds. This energy is well below the energy required for decomposition of the color forming composition. Variables such as spot size, focus, and laser power will also affect any particular system design and can be chosen based on the desired results. With these variables, the infrared radiation source can direct infrared radiation to the color forming composition in accordance with data received from a signal processor. Further, leuco dye and/or infrared radiation absorber concentration and proximity to one another can also be varied. Typically, the absorber and the leuco dye are present in a common layer, and thus, concentration ratios can be considered for a desired affect. However, if the color forming composition and absorber are placed in separate layers, proximity can be considered.

The leuco dyes of the color forming compositions can be developed using lasers having from about 15 to 100 mW power usage, although lasers having a power outside this range can also be used. Typically, lasers having from about 30 mW to about 50 mW are readily commercially available. The spot size can be determined by considering the electromagnetic radiation source, and can range from about 1 to about 200 μm, though smaller or larger sizes can also be used. Heat flux is a variable that can be altered as well, and can be from about 0.05 to 5.0 $J/cm^2$ in one embodiment, and from about 0.3 to 0.5 $J/cm^2$ in a second embodiment. Heat flux in these ranges allow for development of leuco dyes in from about 10 to about 100 microseconds per dot in some embodiments. Those skilled in the art can adjust these variables and those discussed immediately above to achieve a variety of resolutions and developing times.

The following example illustrates an exemplary embodiment of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Example provides further detail in connection with what are presently deemed to be one practical embodiment of the invention.

EXAMPLE

A dispersion of 20 wt % flouran dye S205, 0.5 wt % IR780PP absorber (Aldrich), 10 wt % 2-hydroxy-1-aminopropanol, 15 wt % zinc 3,5-di-tert-butyl salicylate, 10 wt % acetyl TG-SA (protected activator), and 20 wt % CDG000 polymerizable matrix (available from Norcote Inc.). The color forming solution was applied to an optical disk substrate and cured under UV light. Heat was then applied by activating the absorber with a 780 nm laser at about 35 mW power for about 200 microseconds. The resulting reaction provided an intense black color having an optical density of greater than about 1.0. A reaction scheme depicting the color forming components is shown as follows:

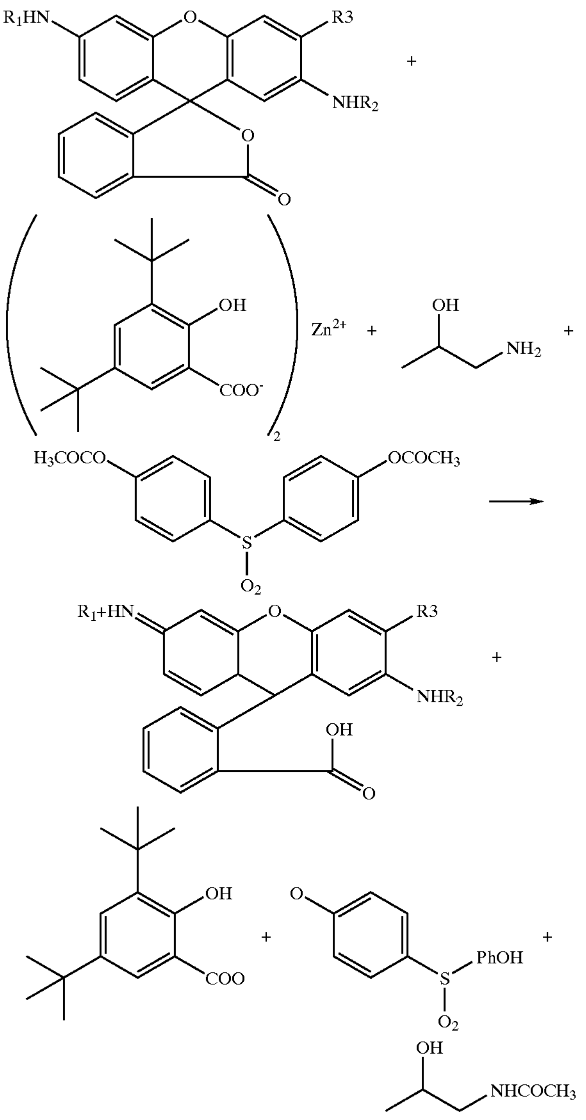

It is to be understood that the above-referenced arrangements are illustrative of the application for the principles of the present invention. Numerous modifications and alternative arrangements can be devised without departing from the spirit and scope of the present invention while the present invention has been described above in connection with the exemplary embodiments(s) of the invention. It will be apparent to those of ordinary skill in the art that numerous modifications can be made without departing from the principles and concepts of the invention as set forth in the claims.

What is claimed is:

1. A color forming composition, comprising a mixture of:

a) a color forming leuco dye;

b) a metal salt activator configured for reaction with the color forming leuco dye to form a colored dye;

c) a suppression agent configured for inhibition of reaction of the metal salt activator with the color forming leuco dye; and d) an initiator precursor configured for forming an initiator which reacts with the suppression agent upon application of energy.

2. The composition of claim 1, wherein the metal salt activator is a metal salt of an aromatic carboxylic acid.

3. The composition of claim 1, wherein the metal salt activator is selected from the group consisting of zinc salicylate, zinc 3,5-di-t-butyl salicylate, tin salicylate, zinc 2-hydroxy naphthoate, 3,5-di-α-methylbenzyl zinc salicylate, metal rhodanate, metal xanthate, metal aluminate, metal titanate, metal zirconate, and mixtures thereof.

4. The composition of claim 3, wherein the metal salt activator is zinc 3,5-di-t-butyl salicylate.

5. The composition of claim 1, wherein the suppression agent is a primary or secondary amine.

6. The composition of claim 1, wherein the suppression agent is selected from the group consisting of 2-hydroxy-1-aminopropanol, butyl amine, valoneol, prolinol, 2-amino-3-phenyl]-propanol, (R)-(-)-2-phenyl glycinol, 2-amino-phenylethanol, 1-naphthylethyl amine, 1-aminonaphthalene, morpholin, and mixtures thereof.

7. The composition of claim 6, wherein the suppression agent is 2-hydroxy-1-aminopropanol.

8. The composition of claim 6, wherein the suppression agent is butyl amine.

9. The composition of claim 1, wherein the suppression agent is a member selected from the group consisting of 1,3-diketones, diols, keto-esters, and mixtures thereof.

10. The composition of claim 1, wherein the initiator precursor comprises a secondary activator protected by an initiator; and wherein the suppression agent further acts as a deprotecting agent and is configured for removing the initiator upon application of energy.

11. The composition of claim 10, wherein the secondary activator is a member selected from the group consisting of phenols, carboxylic acids, cyclic sulfonamides, protonic acids, and mixtures thereof.

12. The composition of claim 11, wherein the secondary activator compound is bis-(3-allyl-hydroxyphenyl)sulfone.

13. The composition of claim 1, wherein the initiator precursor is a member selected from the group consisting of esters, sulfonates, phosphinates, carbonates, carbamates, and mixtures thereof.

14. The composition of claim 1, wherein the initiator precursor includes an ester or anhydride functional group.

15. The composition of claim 1, wherein the initiator is an acyl.

16. The composition of claim 1, wherein the initiator is a silica gel.

17. The composition of claim 1, further comprising an infrared radiation absorber.

18. The composition of claim 1, wherein the color forming composition is spin-coatable.

19. An optical disk, comprising an optical disk substrate having a color forming composition coated thereon, said color forming composition comprising:

a) a color forming leuco dye;

b) a metal salt activator configured for reaction with the color forming leuco dye to form a colored dye;

c) an amine suppression agent configured for inhibition of reaction of the metal salt activator with the color forming leuco dye; and d) an initiator precursor configured for forming an initiator upon application of energy.

20. The optical disk of claim 19, wherein the metal salt activator is a metal salt of an aromatic carboxylic acid.

21. The optical disk of claim 20, wherein the metal salt activator is selected from the group consisting of zinc salicylate, zinc 3,5-di-t-butyl salicylate, tin salicylate, zinc 2-hydroxy naphthoate, 3,5-di-α-methylbenzyl zinc salicylate, metal rhodanate, metal xanthate, metal aluminate, metal titanate, metal zirconate, and mixtures thereof.

22. The optical disk of claim 21, wherein the metal salt activator is zinc 3,5-di-t-butyl salicylate.

23. The optical disk of claim 19, wherein the suppression agent is a member selected from the group consisting of 2-hydroxy-1-aminopropanol, butyl amine, and mixtures thereof.

24. The optical disk of claim 19, wherein the initiator precursor comprises a secondary activator protected by the initiator, and wherein the suppression agent further acts as a deprotecting agent and is configured for removing the initiator upon application of energy.

25. The optical disk of claim 19, wherein the initiator precursor is a member selected from the group consisting of esters, sulfonates, phosphinates, carbonates, carbamates, and mixtures thereof.

26. The optical disk of claim 19, wherein the suppression agent is a member selected from the group consisting of valoneol, prolinol, 2-hydroxy-1-amino-propanol, 2-amino-3-phenyl-1-propanol, (R)-(-)-2-phenyl glycinol, 2-amino-phenylethanol, 1-naphthylethyl amine, 1-aminonaphthalene, morpholin, and mixtures thereof.

27. The optical disk of claim 19, wherein the color forming composition further comprises an infrared radiation absorber in thermal contact with the initiator precursor.

28. The optical disk of claim 19, wherein the color forming composition further comprises a binder.

29. The optical disk of claim 19, wherein the color forming composition further comprises a non-leuco colorant.

30. A method of forming color images on a substrate, comprising:

a) applying a color forming composition onto a substrate, said color forming composition being a mixture including:

i) a color forming leuco dye;

ii) a metal salt activator configured for reaction with the color forming leuco dye to form a colored dye;

iii) a suppression agent configured for inhibition of reaction of the metal salt activator with the color forming leuco dye; and iv) an initiator precursor configured for forming an initiator upon application of energy; and b) applying energy to the color forming composition sufficient to cause reaction of the metal salt activator with the leuco dye without decomposing the color forming composition.

31. The method of claim 30, wherein the energy is applied at from about 0.3 to aobut 0.5 $J/cm^2$.

32. The method of claim 30, wherein the energy is applied at from about 0.3 to about 0.5 $J/cm^2$.

33. The method of claim 30, wherein the energy is applied for about 100 to about 500 microseconds.

34. The method of claim 30, wherein the color forming composition further comprises an infrared radiation absorber admixed with or in thermal contact with the initiator precursor.

35. The method of claim 34, wherein the energy is applied using an infrared laser.

36. The method of claim 30, wherein the metal salt activator is a zinc salt of an aromatic carboxylic acid.

37. The method of claim 30, wherein the suppression agent is selected from the group consisting of 2-hydroxy-1-aminopropanol, butyl amine, and mixtures thereof.

38. The method of claim 30, wherein the initiator precursor is a member selected from the group consisting of esters, sulfonates, phosphinates, carbonates, carbamates, and mixtures thereof.

39. The method of claim 30, wherein the substrate is an optical disk.

* * * * *

UNITED STATES PATENT AND TRADEMARK OFFICE

CERTIFICATE OF CORRECTION

PATENT NO. : 6,890,614 B2
DATED : May 10, 2005
INVENTOR(S) : Gore et al.

It is certified that error appears in the above-identified patent and that said Letters Patent is hereby corrected as shown below:

Column 15,
Line 27, delete "3-phenyl]-propanol," and insert -- 3-phenyl-1-propanol, --.

Signed and Sealed this

Tenth Day of January, 2006

JON W. DUDAS
*Director of the United States Patent and Trademark Office*